(12) United States Patent
Bandi et al.

(10) Patent No.: US 8,307,417 B2
(45) Date of Patent: Nov. 6, 2012

(54) PORT ENABLEMENT

(75) Inventors: Sridhar Bandi, Karnataka (IN); Kiran Kumar Malle Gowda, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 12/370,608

(22) Filed: Feb. 13, 2009

(65) Prior Publication Data

US 2009/0228972 A1    Sep. 10, 2009

(30) Foreign Application Priority Data

Mar. 6, 2008  (IN) .............................. 570/CHE/2008

(51) Int. Cl.
    G06F 9/00      (2006.01)
    G06F 15/16     (2006.01)
    G06F 17/00     (2006.01)
(52) U.S. Cl. ........................................ 726/11; 709/245
(58) Field of Classification Search ....................... 726/11
    See application file for complete search history.

(56) References Cited

U.S. PATENT DOCUMENTS

| 5,848,233 | A | 12/1998 | Radia et al. | |
|---|---|---|---|---|
| 6,415,329 | B1 * | 7/2002 | Gelman et al. ................ | 709/245 |
| 7,089,294 | B1 * | 8/2006 | Baskey et al. ................ | 709/219 |
| 7,505,451 | B2 * | 3/2009 | Hashizume et al. .......... | 370/352 |
| 7,631,084 | B2 * | 12/2009 | Thomas et al. ............... | 709/227 |
| 7,987,359 | B2 * | 7/2011 | Kawano et al. ............... | 713/161 |
| 2006/0165074 | A1 * | 7/2006 | Modi et al. .................... | 370/389 |
| 2009/0310541 | A1 * | 12/2009 | Watanabe ..................... | 370/328 |

OTHER PUBLICATIONS

Cisco Systems, Inc; IP Solution Center—Management for Scalable Security Deployments; All contents are Copyright © 1992-2003 Cisco Systems, Inc.
J. Burns, et al; Automatic Management of Network Security Policy; Telcordia Technologies, Inc.2001 Telcordia Technologies, Inc.
Konstantinou, Alexander V. et al; Managing Security in Dynamic Networks 1999 LISA XIII—Nov. 7-12, 1999—Seattle, WA.

* cited by examiner

*Primary Examiner* — Kambiz Zand
*Assistant Examiner* — Dant Shaifer Harriman (57) ABSTRACT

Included are embodiments for port enablement. One embodiment of a method includes inserting a streams module in a kernel space of a host device, the streams module being coupled to a stream head, the streams module coupled to a transmission control protocol (TCP) module and receiving a bind request on a socket, the bind request associated with an application. Embodiments also include determining a process name associated with the received bind request, determining, based on the determined process name, a meta-configuration rule for a firewall configuration of the application and utilizing the determined meta-configuration rule for the firewall configuration of the application.

20 Claims, 4 Drawing Sheets

PORT ENABLEMENT

CROSS-REFERENCE TO RELATED APPLICATION

This application claims priority to Indian Patent Application No. 570/CHE/2008, entitled "PORT ENABLEMENT", filed on Mar. 6, 2008, which is hereby incorporated by reference in its entirety.

BACKGROUND

As electronic communications technologies have advanced, there has been an increased desire for security from viruses, worms, spyware, and other malicious programs. One of the measures to prevent such harmful programs from affecting a host device, such as a computer, mobile telephone, personal digital assistant (PDA), is a firewall. Often, firewalls utilize firewall rules for one or more ports of a host device that are built and maintained statically by an administrator. However, with the proliferation of remote method invocation/remote procedure call (RMI/RPC) based applications, the port number to which these applications bind to may not be known a priori. Thus, often it may be difficult to configure the firewall rules for this class of applications.

SUMMARY

Included are embodiments for port enablement. One embodiment of a method includes inserting a streams module in a kernel space of a host device, the streams module being coupled to a stream head, the streams module coupled to a transmission control protocol (TCP) module and receiving a bind request on a socket, the bind request associated with an application. Embodiments also include determining a process name associated with the received bind request, determining, based on the determined process name, a meta-configuration rule for a firewall configuration of the application and utilizing the determined meta-configuration rule for the firewall configuration of the application.

Also included are embodiments of a computer readable medium. One embodiment includes a stream head and a streams module, inserted in a kernel space of a host device, the streams module being coupled to the stream head, the streams module coupled to a transmission control protocol (TCP) module, the streams module configured to receive a bind request on a socket, the bind request associated with an application, determine a process name associated with the received bind request, and, based on the determined process name, determine a meta-configuration rule for a firewall configuration of the application.

Also included are embodiments of a system. One embodiment of a system includes means for inserting a streams module in a kernel space of a host device, the streams module being coupled to a stream head, the streams module coupled to a transmission control protocol (TCP) module and means for receiving a bind request on a socket, the bind request associated with an application. Embodiments also include means for determining a process name associated with the received bind request, means for, based on the determined process name, determining a meta-configuration rule for a firewall configuration of the application, and means for utilizing the meta-configuration rule for the firewall configuration of the application.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

System firewalls and/or packet filters may be used to block and/or allow access to ports on a system using a set of pre-configured rules. Internet protocol (IP)-filter, IP-tables, pf (packet filter) are examples of such system based firewalls, hence forth referred to simply as firewalls. Firewalls may be configured to achieve packet filtering for both incoming and outgoing packets on host device, based on a set of firewall rules. The filter rules may be flexible to configure and may be based on various parameters like LAN interfaces, IP addresses, network protocols (e.g., TCP/UDP/ICMP), and port numbers (for specific applications). New rules may be added based on the target application's usage of specific ports. A sample firewall rule is as follows: pass in proto TCP from 10.2.2.2/24 to 10.1.1.2/32 port=6667.

Firewall rules may be built and maintained statically by an administrator in case of the applications that use ports, such as telnet and/or secure shell (SSH). With the proliferation of remote method invocation/remote procedure call (RMI/RPC) based applications, the port number to which these applications bind to may not be known a priori hence, it may not be efficient (in some nonlimiting examples) to configure the firewall rules for this class of applications at startup.

Additionally, monitoring and configuring these applications to enable these ports for communication could become overkill, as these applications may switch to different ports once restarted and, as such, a pattern may be difficult to devise to enable/disable the ports by continuous monitoring. Also, such a technique could expose window of opportunity for malicious activities when the rules configured by hand to allow RPC type communication live longer than the duration of the application itself. In such a scenario, a rogue application could begin communicating using the port which was opened by RPC application, owing to the above risk.

As such, this disclosure includes embodiments for dynamically opening ports used by a predetermined class of applications into the firewall rules. One embodiment, among others, could be to determine the port to which the application is bound (e.g., by using network monitoring tools), and use this information to configure appropriate firewall rules. Additionally, an automated solution to dynamically configure firewall rules based on a list of predetermined applications is also included.

Similarly, this disclosure includes embodiments for automatically configuring firewall rules on a per-application basis by using a streams module inserted between the stream head and transport module. More specifically, embodiments included herein involve a streams module inserted between a stream head and a transport module.

Figure 1:
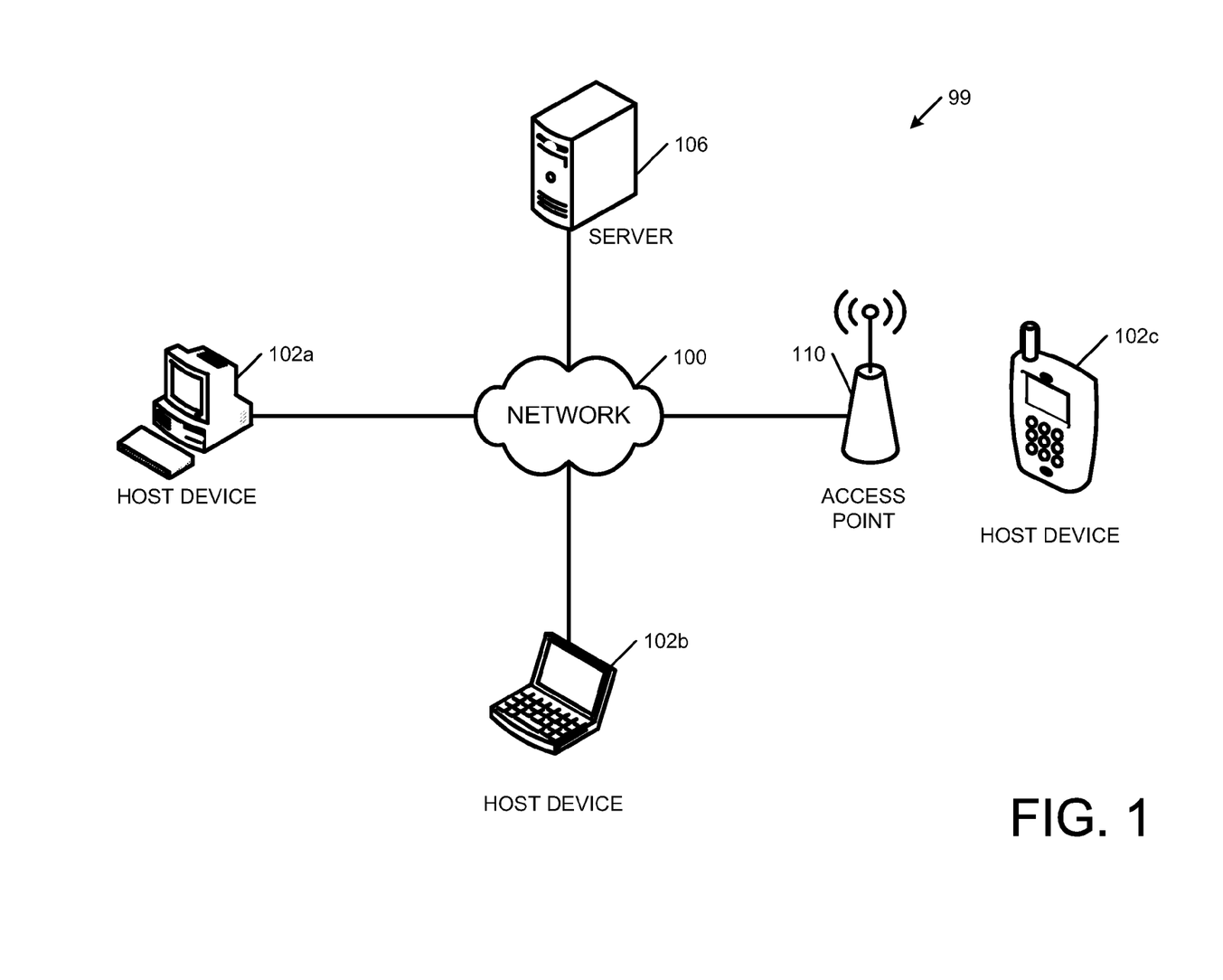
FIG. 1 is a network diagram illustrating an exemplary embodiment for communicating data with a host device.

FIG. 1 is a network diagram 99 illustrating an exemplary embodiment for communicating data with a host device. More specifically, as illustrated in the nonlimiting example of FIG. 1, a network 100 may be utilized and may include a wide area network (WAN), such as the Internet, a public switched telephone network (PSTN), a mobile communications network (MCN) and/or other network. Similarly, the network 100 may include a wireline and/or a wireless local area network (LAN). Regardless of the communications medium and protocol, the network 100 may be coupled to one or more host devices 102*a*, 102*b*, 102*c*. The host devices 102*a*, 102*b*, 102*c* (collectively referred to as host device 102) may include a personal computer, laptop, and/or other device that is configured for communicating with the network 100. While the host devices 102*a*, 102*b* may be wireline devices, the host device 102*c* may be configured for wireless communications and be configured to communicate with the network 100 via an access point 110 or other wireless communications devices.

Additionally included in the nonlimiting example of FIG. 1, is the access point 110. The access point 110 may be configured as a wireless cellular tower, a wireless fidelity (WIFI) hotspot, a worldwide interoperability for microwave access (WIMAX) tower, and/or other wireless node.

Also included in the nonlimiting example of FIG. 1 is a server 106. The server 106 may be configured to facilitate the communication of electronic messages, which may include email, instant messages, short message service (SMS) messages audio messages, video messages, and/or other electronic messages. In some embodiments, the server 106 may be configured to provide messaging services to an account associated with the host device 102*a*. Similarly, in some embodiments, the server 106 may be configured to provide messaging services to one or more accounts associated with host devices 102*b* and 102*c*.

Figure 2:
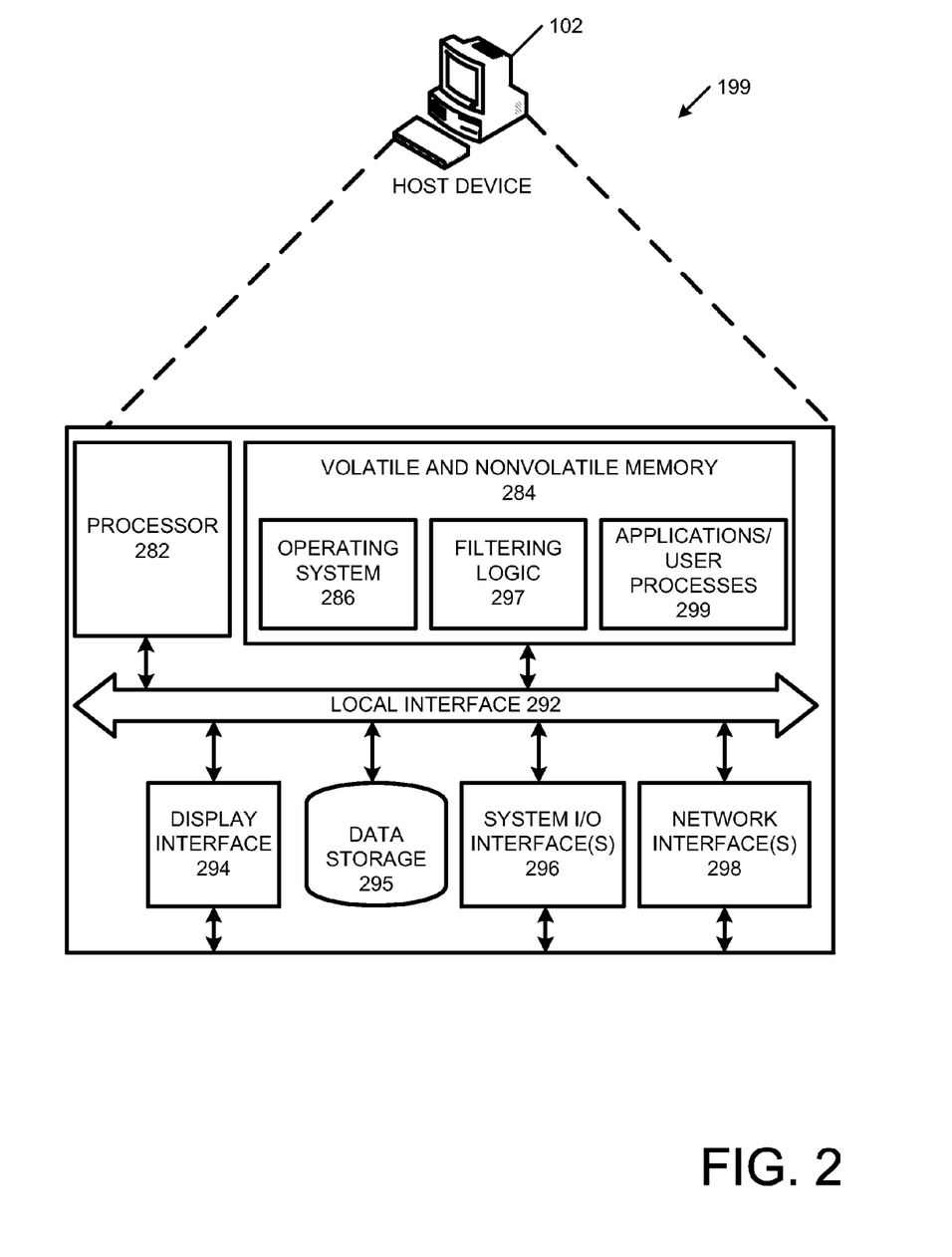
FIG. 2 is a block diagram illustrating an exemplary embodiment of a host device, such as the host device from FIG. 1.

FIG. 2 is a block diagram 199 illustrating an exemplary embodiment of a host device 102, such as any host device 102*a*, 102*b*, or 102*c* from FIG. 1. According to exemplary embodiments, in terms of hardware architecture, the host device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the host device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include the applications/user processes 299, filtering logic 297, as well as an operating system 286. The operating system 286 may be configured to control the execution of other computer programs and provides scheduling, input-output control, file and data management, memory management, and communication control and related services. The filtering logic 299 may include firewall logic, firewall rules logic, and/or may be configured to facilitate perform one or more actions, as discussed in more detail below.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The input/output devices that may be coupled to the system I/O Interface(s) 296 may include input devices, for example but not limited to, a keyboard, mouse, scanner, touch screen, microphone, etc. Further, the input/output devices may also include output devices, for example but not limited to, a printer, display, speaker, etc. Further, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the host device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the host device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the host device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the host device 102 is activated.

When the host device 102 is in operation, the processor 282 may be configured to execute software stored within the memory component 284, to communicate data to and from the memory component 284, and to generally control operations of the host device 102 pursuant to the software. Software in the memory component 284, in whole or in part, may be read by the processor 282, perhaps buffered within the processor 282, and then executed.

One should note that while the description with respect to FIG. 2 includes the host device 102 as a single component, this is a nonlimiting example. More specifically, in at least one embodiment, the host device 102 can include a plurality of servers, personal computers, telephones, and/or other devices. Similarly, while the description of FIG. 2 describes the host device 102 as a personal computer, this is also a nonlimiting example. More specifically, depending on the particular exemplary embodiment, other components, such as the servers 106 and/or the access point 110 may include similar elements and/or logic.

Additionally, while the filtering logic 297 is illustrated in FIG. 2 as including a single software component, this is also a nonlimiting example. In at least one embodiment, the filtering logic 297 may include one or more components, embodied in software, hardware, and/or firmware. Additionally, while the filtering logic 297 is depicted as residing on a single device, such as host device 102, the filtering logic 297 may include one or more components residing on one or more different devices.

Figure 3:
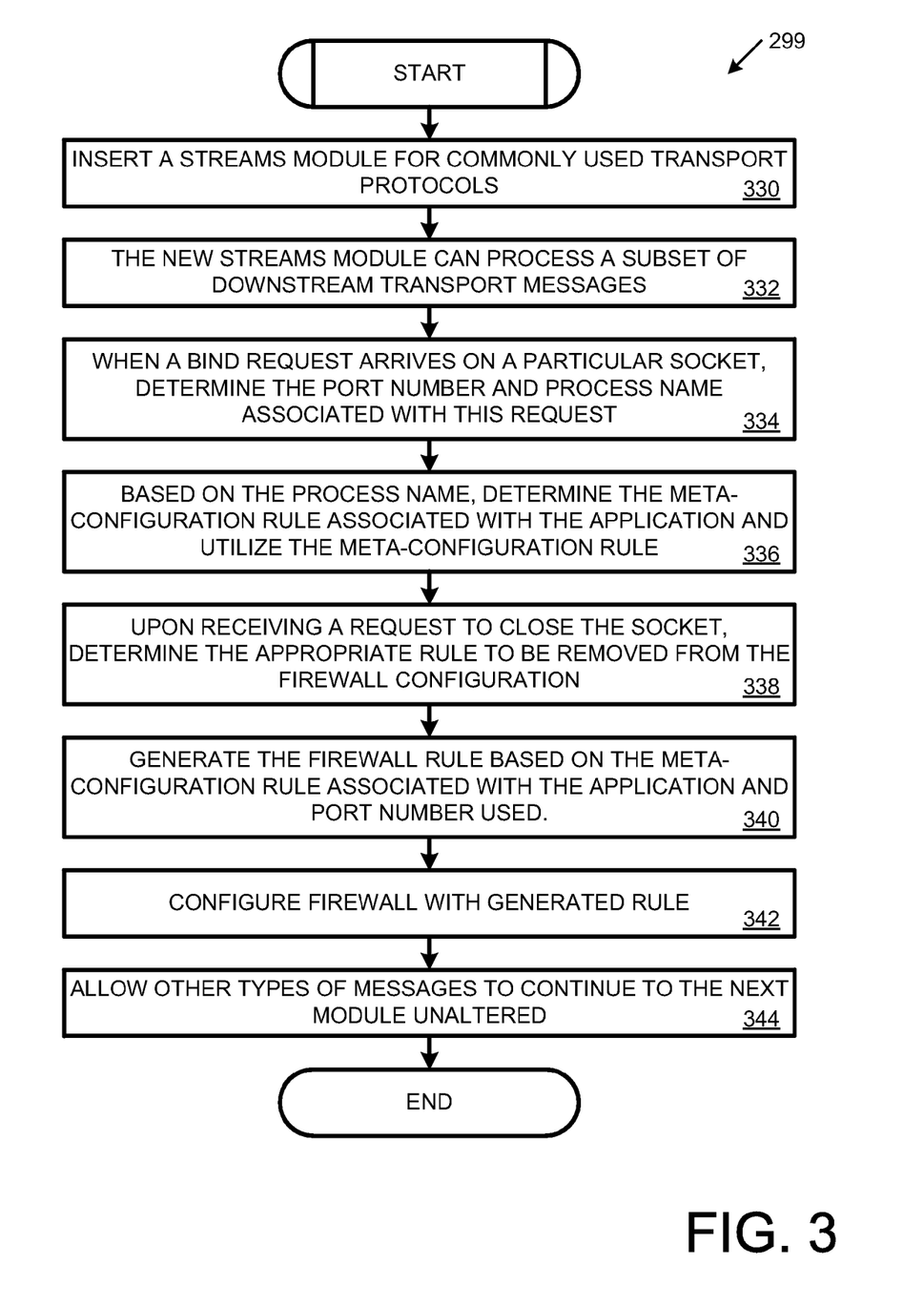
FIG. 3 is a flowchart illustrating an exemplary embodiment of a process for a streams module inserted between a stream head and a transport module, such as may be performed by the host device from FIG. 2.

FIG. 3 is a flowchart 299 illustrating an exemplary embodiment of a process for a streams module inserted between a stream head and a transport module, such as may be performed by the host device from FIG. 2. As illustrated in the nonlimiting example of FIG. 3, a streams module may be inserted for one or more commonly used transport protocols (block 330). The streams module can process a subset of downstream transport messages (block 332). A bind request can then be received at a socket. When the bind request arrives on a particular socket, a determination can be made regarding the port number and process name associated with the request (block 334). Based on the determined process name, a determination can be made of the meta-configuration rule associated with the application. Additionally, the meta-configuration rule can be utilized (block 336). Upon receiving a request to close the socket, a determination can be made regarding the appropriate rule to be removed from the firewall configuration (block 338). A firewall rule can be generated, based on a meta-configuration rule associated with the application and/or port number used (block 340). The firewall can be configured with the generated rule (block 342). Additionally, other types of messages may be allowed to continue to the next module with little or no alteration (block 344).

As indicated above, in at least one embodiment, both the rule creation and deletion may occur in the new stream module inserted between the stream head and the transport module. Additionally, in at least one exemplary embodiment, a mechanism to dynamically provision system level firewalls to configure the access control rules that cannot be configured statically may also be included. As such, human intervention may be unnecessary to control access to dynamic port based applications. This helps the system level firewalls to adapt to the new ports that are opened by trusted applications. Additionally, some technologies, such as application white-lists, trusted platform modules (e.g., from trusted computing group) can be used to determine whether the trusted application itself has not suffered any unauthorized modification.

One should note that while the nonlimiting example of FIG. 3 is illustrated as a flowchart, this is a nonlimiting example. More specifically, at least one embodiment may be viewed as a process for inserting the streams module and implementing the inserted streams module. As such, depending on the particular configuration, one or more of the blocks in FIG. 3 may be implemented in a different order and/or excluded.

Figure 4:
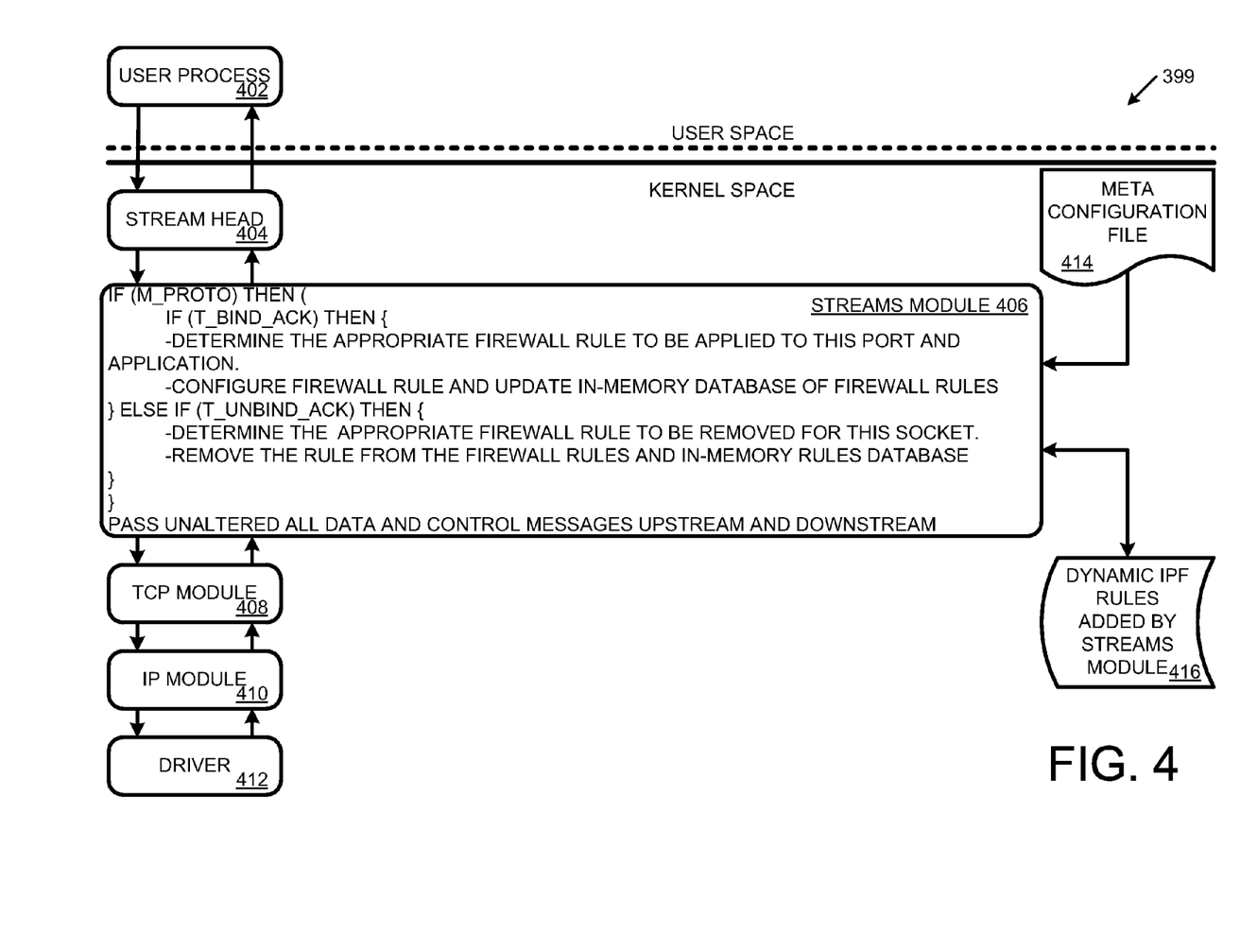
FIG. 4 is a flowchart illustrating an exemplary embodiment of a process for applying at least one firewall rule, similar to the diagram from FIG. 3.

FIG. 4 is a flowchart 399 illustrating an exemplary embodiment of a process for applying at least one firewall rule, similar to the diagram from FIG. 3. As illustrated in the nonlimiting example of FIG. 4, a user process, 402, may be stored in applications/user processes component 299. The user process 402 may be configured to communicate data with a stream head 404, which may be located in kernel space (e.g., in the operating system 286). Additionally, a streams module 406 may be inserted between the stream head 404 and a transmission control protocol (TCP) module 408. The streams module 406 may be configured to implement one or more algorithms to utilize application-specific firewall rules. More specifically, in response to a determination that a bind acknowledgement is received, the streams module 406 may be configured to determine the appropriate firewall rule to apply to a particular port and for a particular application. Additionally, the streams module 406 may also be configured to configure the firewall rule and update an in-memory database of firewall rules.

Alternatively, if an unbind acknowledgement is received, the streams module 406 may be configured to determine the appropriate firewall rule to be removed for this socket. Additionally, the streams module 406 may be configured to remove the rule from the firewall rules and in-memory rules database.

Also coupled to the streams module 406 is a meta-configuration file 414. The meta-configuration file 414 may be utilized for managing the applications using this framework, which may include one or more fields for each application. The first field, application path, may be configured to identify the application that is running. Another field that may be included is a meta-rule that may be used for the application matching with the first parameter, the missing part in this rule could be the port number which will be replaced by the streams module 406 that will parse this rule at runtime. Dynamic Internet protocol filter (IPF) rules 416 may also be added to the streams module 406. Additionally, coupled to the TCP module 408 is an internet protocol (IP) module 410. A driver 412 may be coupled to the IP module 410.

One should note that, while some embodiments include applications being stored locally, at least one embodiment may be configured differently. More specifically, at least one exemplary embodiment may be configured with an advanced policy server processing a request for providing the appropriate rules. Such a server may be configured for using criteria such as the following for the given application: running in this part of the network, during this time of day, etc.

Below is a nonlimiting example of an entry where the port number that the application actually binds to will be replaced in the <PORT> in the rule and will be pushed to the firewall. In this nonlimiting example, the braced portion ("[ ]") portion indicates a pathname and the bracketed portion ("{ }") indicates the firewall meta-rule to be configured: [/opt/sample/bin/sampleprogram] "{pass in proto tcp from 10.2.2.2/24 to 10.1.1.2/32 port=<PORT>}".

As discussed above, the streams module 406 may be configured to create additional firewall rules for each application at runtime when an application creates a new connection. Additionally, the streams module 406 may also be configured to remove the rules from the set once the application is finished with that socket. As such, a mechanism may be included to pass on the rule information from the rule creation time to the rule destruction time. For this purpose, a temporary file and/or an in memory database with the following table structure may be included: <PID> <Application Name> <socket descriptor> <Firewall Rule>.

The streams module 406 may also be configured to create at least one entry for each rule that the streams module 406 creates in the table with the socket descriptor into the in-memory data store. The interfaces may also be configured to log this information into a log file (which can be used for auditing and/or troubleshooting purposes). A copy of this database can also be stored into secondary storage, which can be used to clean up the firewall rules if the application terminates abnormally. The cleanup can be performed manually and/or using an automated process or a thread periodically.

Additionally, embodiments disclosed herein can be used for creating firewall rules when the application opens up any socket that is bound to any particular port. There are a plurality of ways in which any application can bind to random ports, however the final call that is invoked is a bind( ) system call or similar call. The port number to which a given socket is bound may be determined after the bind system call is successfully completed by the TCP module 408 on a T_BIND_REQ request issued as a M_PROTO message by the application.

The streams module 406 that would be inserted between the stream head 404 and the TCP module 408 may be configured to intercept the T_BIND_ACK reply that is being sent by the TCP module 408 to the application in response to the T_BIND_REQ once the bind( ) call is successfully completed. The TCP module 408 can retrieve the port number to which the socket is bound. The TCP module 408 may be configured to determine the full pathname of the current application and may be configured to use this to locate a suitable firewall rule as configured by the administrator in a meta-configuration rule. The TCP module 408 can also add this rule to the list of existing firewall rules after replacing the port number retrieved. If there is no rule configured for the application in the metaconfiguration file, then no action is taken. Existing applications need not be modified while using this approach for this feature. However, the administrator may configure the rules to be applied to this application. Apart from the addition and configuration of the rules, the streams module 406 may also be configured to add the generated rule to an in-memory database and/or a file for reference by the same module to remove the rule while closing the socket.

Additionally, embodiments disclosed herein can be used for un-configuring a firewall rule created for an application. When the application is finished using a socket, the application can release the port using any number of techniques, such as closing the socket (e.g., a "close( ) system" call) and/or exiting the application. At least one embodiment may be configured to remove firewall rules associated with an application in the firewall rules as well as the rule store (which can be a file or in memory database).

The same streams module 406 that performs the addition and configuration of the firewall rule may be configured to also perform the removal of a rule from firewall rules (as well as from the rule store). The streams module 406 may be configured to intercept the messages of type T_UNBIND_ACK reply that is being sent by the TCP module to the application in response to T_UNBIND_REQ. The streams module 406 may also be configured to retrieve the information about the socket using the socket descriptor and pick the corresponding rule from the rule store and remove the rule from the firewall rules and also the rule store. This will help the existing applications that already are using close( ) system call.

Embodiments may also be configured to provide a default exit (e.g., atexit( )) handler for the applications. The handler can check if there are any rules configured in the rule store for the current application. If there are rules then removes all the firewall rules and cleanup the rule store otherwise return a "success" indication. The exit handler may be registered at the time of initial creation of any rule for the current application.

Embodiments outlined in this document may be configured for the insertion of a streams module 406, configuration file processing, firewall rule generation, dynamic addition of firewall rules, and/or dynamic removal of firewall rules. The streams architecture is modular and designed for extensibility, so there may be few or no issues in implementing a new streams module 406 and inserting the streams module 406 in between the stream head and the transport module. The configuration file processing is very straight forward. Additionally, many firewall products provide interfaces to add and remove the filtering rules dynamically.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method, comprising:
   inserting a streams module in a kernel space of a host device having a processor, the streams module coupled to a transmission control protocol (TCP) module;
   receiving a bind request on a socket, the bind request associated with an application;
   determining, by the streams module, a process name and port number associated with the received bind request;
   determining, by the streams module, based on the determined process name, a meta-configuration rule for a firewall configuration of the application; and
   generating a firewall rule based on the determined port number and the determined meta-configuration rule, the firewall rule configuring the firewall configuration of the application.

2. The method of claim 1, further comprising receiving a request to close the socket and, in response to receiving the request to close the socket, removing the firewall rule from a set of firewall rules for the application.

3. The method of claim 2, further comprising closing the socket in response to the request to close the socket.

4. The method of claim 1, wherein the TCP module is coupled to an Internet protocol (IP) module.

5. The method of claim 1, further comprising:
   generating, by the streams module, another firewall rule for the application in response to the application opening another connection.

6. The method of claim 1, wherein the generated firewall rule controls whether a packet is to be blocked from entering a network.

7. The method of claim 1, wherein the meta-configuration rule includes a field containing a port number, the method further comprising:
   replacing, by the streams module, the port number in the field of the meta-configuration rule with the determined port number associated with the bind request.

8. A non-transitory computer readable medium storing instructions executable by a host device having a processor, the instructions comprising:
   a stream head; and
   a streams module, inserted in a kernel space of the host device, the streams module being coupled to the stream head, the streams module coupled to a transmission control protocol (TCP) module, the streams module configured to:
      receive a bind request on a socket, the bind request associated with an application,
      determine a process name and a port number associated with the received bind request,
      based on the determined process name, determine a meta-configuration rule for a firewall configuration of the application, and
      generate a firewall rule based on the port number and the meta-configuration rule, where the firewall rule is used for the application.

9. The non-transitory computer readable medium of claim 8, wherein the streams module is further configured to receive a request to close the socket and, in response to receiving the request to close the socket, remove the firewall rule from a set of firewall rules for the application.

10. The non-transitory computer readable medium of claim 9, wherein the streams module is further configured to close the socket in response to the request to close the socket.

11. The non-transitory computer readable medium of claim 8, wherein the instructions further comprise the TCP module and an Internet protocol (IP) module, wherein the TCP module is coupled to the IP module.

12. The non-transitory computer readable medium of claim 8, wherein the streams module is configured to further:
   generate another firewall rule for the application in response to the application opening another connection.

13. The non-transitory computer readable medium of claim 8, wherein the generated firewall rule controls whether a packet is to be blocked from entering a network.

14. The non-transitory computer readable medium of claim 8, wherein the meta-configuration rule includes a field containing a port number, and wherein the streams module is configured to further:
   replace the port number in the field of the meta-configuration rule with the determined port number associated with the bind request.

15. A system, comprising:
   at least one processor;
   a kernel space;
   a transmission control protocol (TCP) module; and
   a streams module inserted in the kernel space, the streams module coupled to the TCP module, the streams module executable on the at least one processor to:
      receive a bind request on a socket, the bind request associated with an application;
      determine a process name and port number associated with the received bind request;
      based on the determined process name, determine a meta-configuration rule for a firewall configuration of the application; and
      create a firewall rule based on the port number and the meta-configuration rule, the firewall rule determining the firewall configuration of the application.

16. The system of claim 15, wherein the streams module is executable to further:

receive a request to close the socket; and in response to receiving the request to close the socket, remove the firewall rule from a set of firewall rules for the application.

17. The system of claim 15, wherein the TCP module is coupled to an Internet protocol (IP) module.

18. The system of claim 15, wherein the streams module is configured to further:

generate another firewall rule for the application in response to the application opening another connection.

19. The system of claim 15, wherein the generated firewall rule controls whether a packet is to be blocked from entering a network.

20. The system of claim 15, wherein the meta-configuration rule includes a field containing a port number, and wherein the streams module is executable to further:

replace the port number in the field of the meta-configuration rule with the determined port number associated with the bind request.

* * * * *